United States Patent
Miremadi

(10) Patent No.: US 12,437,898 B2
(45) Date of Patent: Oct. 7, 2025

(54) SYSTEMS AND DEVICES FOR AN RF SIGNAL CARRYING CABLE OF A MULTI-PACK LAUNCHER SYSTEM

(71) Applicant: AeroVironment, Inc., Arlington, VA (US)

(72) Inventor: Reza Miremadi, West Hills, CA (US)

(73) Assignee: AeroVironment, Inc., Arlington, VA (US)

( * ) Notice: Subject to any disclaimer, the term of this patent is extended or adjusted under 35 U.S.C. 154(b) by 37 days.

(21) Appl. No.: 18/367,422

(22) Filed: Sep. 12, 2023

(65) Prior Publication Data

US 2024/0013949 A1  Jan. 11, 2024

Related U.S. Application Data

(63) Continuation of application No. 17/473,606, filed on Sep. 13, 2021, now Pat. No. 11,791,063, which is a continuation of application No. 17/016,070, filed on Sep. 9, 2020, now Pat. No. 11,145,435.

(60) Provisional application No. 62/898,479, filed on Sep. 10, 2019.

(51) Int. Cl.
| | |
|---|---|
| *H01B 7/22* | (2006.01) |
| *B64U 70/50* | (2023.01) |
| *B64U 80/40* | (2023.01) |
| *F41F 1/08* | (2006.01) |
| *F41F 3/04* | (2006.01) |
| *B64U 50/15* | (2023.01) |

(52) U.S. Cl.
CPC .............. *H01B 7/228* (2013.01); *B64U 70/50* (2023.01); *B64U 80/40* (2023.01); *F41F 1/08* (2013.01); *F41F 3/04* (2013.01); *B64U 50/15* (2023.01)

(58) Field of Classification Search
CPC .............. H05K 5/03; F41F 3/04; B64U 50/15
See application file for complete search history.

(56) References Cited

U.S. PATENT DOCUMENTS

| | | | |
|---|---|---|---|
| 4,063,485 A | 12/1977 | Carter et al. | |
| 6,630,902 B1 | 10/2003 | Fenton et al. | |
| 7,438,346 B1 * | 10/2008 | Breed ................... | E05C 17/203 296/146.12 |
| 10,408,567 B1 * | 9/2019 | Carver, II ............... | F41F 3/042 |
| 10,539,396 B1 * | 1/2020 | Plunk .................... | H01Q 21/064 |
| 11,085,227 B2 * | 8/2021 | Roppongi ............. | E05F 15/659 |

(Continued)

OTHER PUBLICATIONS

International Search Report and Written Opinion for PCT/US20/49971, mailed Feb. 4, 2021.

(Continued)

*Primary Examiner* — Timothy J Thompson
*Assistant Examiner* — Amol H Patel
(74) *Attorney, Agent, or Firm* — Command IP LLP; Pejman Yedidsion; Eric Aagaard

(57) ABSTRACT

Systems, devices, and methods including a launch control box; a multi-pack launcher (MPL) box; and a cable connecting the launch control box and the MPL box, where the cable comprises: an outer jacket, a shielded braid, a first wire, a second wire, a third wire, and a fourth wire, where the first wire and the second wire are shielded by the shielded braid, where the third wire and the fourth wire are outside of the shielded braid, and where the third wire and the fourth wire act as an antenna.

17 Claims, 10 Drawing Sheets

(56) References Cited

U.S. PATENT DOCUMENTS

| | | | |
|---|---|---|---|
| 2003/0007851 A1* | 1/2003 | Heigl | H02H 7/0851 |
| | | | 414/454 |
| 2008/0073106 A1 | 3/2008 | Brake et al. | |
| 2008/0078567 A1 | 4/2008 | Miller et al. | |
| 2010/0282051 A1* | 11/2010 | Fleischer | E05F 15/63 |
| | | | 49/156 |
| 2012/0152090 A1 | 6/2012 | Skurdal et al. | |
| 2012/0211562 A1 | 8/2012 | Cook et al. | |
| 2015/0041598 A1 | 2/2015 | Nugent et al. | |
| 2020/0247540 A1* | 8/2020 | Jones | B64D 7/08 |

OTHER PUBLICATIONS

Multi-pack launcher, AeroVironment, Mar. 12, 2017, www.avinc.com.

* cited by examiner

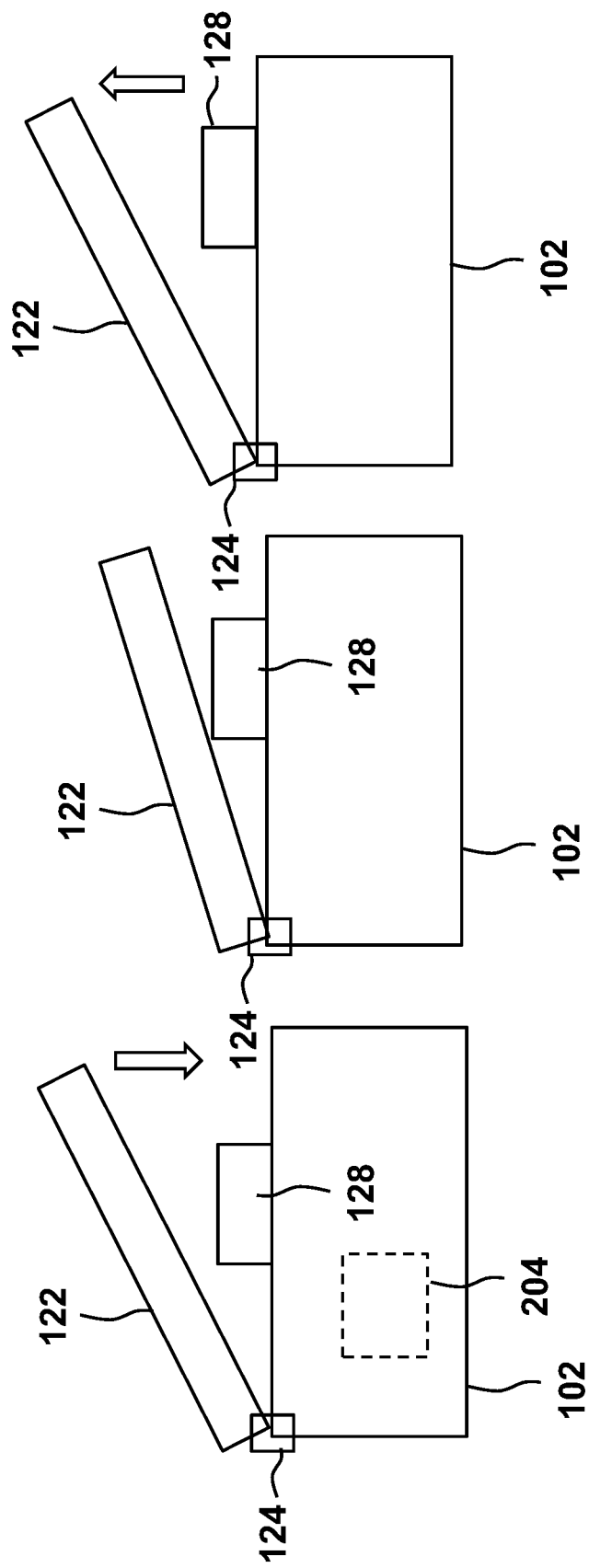

SYSTEMS AND DEVICES FOR AN RF SIGNAL CARRYING CABLE OF A MULTI-PACK LAUNCHER SYSTEM

CROSS-REFERENCE TO RELATED APPLICATIONS

This application is a continuation of U.S. Non-Provisional patent application Ser. No. 17/473,606, filed Sep. 13, 2021, which is a continuation of U.S. Non-Provisional patent application Ser. No. 17/016,070, filed Sep. 9, 2020, which issued as U.S. Pat. No. 11,145,435 on Oct. 12, 2021, which claims priority to and the benefit of U.S. Provisional Patent Application No. 62/898,479, filed Sep. 10, 2019, the contents of all of which are hereby incorporated by reference herein for all 15 purposes.

TECHNICAL FIELD

Embodiments relate generally to control of a launch, and more particularly to a multi-launch system.

BACKGROUND

In some systems, a box may be used to house multiple missiles for remote launch. A wire may be used to remotely trigger the launch of each missile. The wire may enter the box at a box interface. The wire may be shielded and filtered at the box 25 interface so that any radio frequency (RF) signals picked up by the wire do not find their way into the box.

SUMMARY

A system embodiment may include: a launch control box; a multi-pack 30 launcher (MPL) box; and a cable connecting the launch control box and the MPL box, where the cable comprises: an outer jacket, a shielded braid, a first wire, a second wire, a third wire, and a fourth wire, where the first wire and the second wire may be shielded by the shielded braid, where the third wire and the fourth wire may be outside of the shielded braid, and where the third wire and the fourth wire act as an antenna.

System embodiments may further include: at least one missile disposed in the MPL box 102. In additional system embodiments, the at least one missile may be at least one of: an unmanned aerial vehicle (UAV) and an all-up-round (AUR). In additional system embodiments, the at least one missile further comprises at least one antenna, where the at least one antenna may be configured to receive radio frequency (RF) signals from the third wire and the fourth wire of the cable acting as an antenna.

Additional system embodiments may include: a control printed circuit board (PCB) disposed within the MPL box. In additional system embodiments, the RF signals produced by the cable may be filtered with an RF filter disposed on the PCB. In additional system embodiments, an actuator is configured to open and close a door of the MPL box.

Additional system embodiments may include: a current sense circuit in communication with the actuator. In additional system embodiments, the current sense circuit may be configured to detect an object that prevents closing of the door of the MPL box. In additional system embodiments, the current sense circuit detects the object by determining if a current of the actuator exceeds a preset amount for a preset amount of time. In additional system embodiments, the current sense circuit may be configured to open the door via the actuator if the object preventing closing of the door may be detected. In additional system embodiments, the current sense circuit may be configured to turn on a door open indicator light.

In additional system embodiments, the MPL box comprises a metal case 514. Additional system embodiments may include: a box interface disposed in an opening of the MPL box configured to receive the cable, where the box interface isolates the cable from the metal case of the MPL box, and where the box interface prevents RF signals picked up on the third wire and fourth wire of the cable from dissipating into the metal case. In additional system embodiments, the box interface comprises at least one of: polyoxymethylene and rubber.

Additional system embodiments may include: a built-in fuse connected to the cable, where the built-in fuse may be configured to blow if the cable is punctured or damaged, where at least one of the third wire and the fourth wire may be shorted to the shielded braid when the cable is punctured or damaged, and where the shielded braid may be at ground potential.

A method embodiment may include: receiving one or more radio frequency (RF) signals in a portion of a cable disposed outside of a multi-pack launcher (MPL) box, where the cable may include: an outer jacket, a shielded braid, a first wire, a second wire, a third wire, and a fourth wire, where the first wire and the second wire are shielded by the shielded braid, where the third wire and the fourth wire are outside of the shielded braid, and where the third wire and the fourth wire act as an antenna; and transmitting the received one or more RF signals from a portion of the cable disposed inside the MPL box to one or more missiles located inside the MPL box. Additional method embodiments may include: removing RF energy from the cable by an RF filter connected to an end of the cable, wherein the RF filter is disposed within the MPL box.

Another method embodiment may include: determining a presence of an object preventing a door of a multi-pack launcher (MPL) box from closing by a current sense circuit, where the current sense circuit determines the presence of the object if a current of an actuator configured to close the door exceeds a preset amount for a preset high current period of time; and reversing a direction of the door by the current sense circuit if the presence of the object is detected. Additional method embodiments may include: turning on a door open indicator light by the current sense circuit if the presence of the object is detected.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3A depicts an object underneath an open door of an MPL box of the MPL system of FIG. 1;

FIG. 3B depicts the door of the MPL box contacting the object of FIG. 3A;

FIG. 3C depicts the door of the MPL box opening due to contacting the object of FIG. 3B underneath the open door;

DETAILED DESCRIPTION

Figure 1:
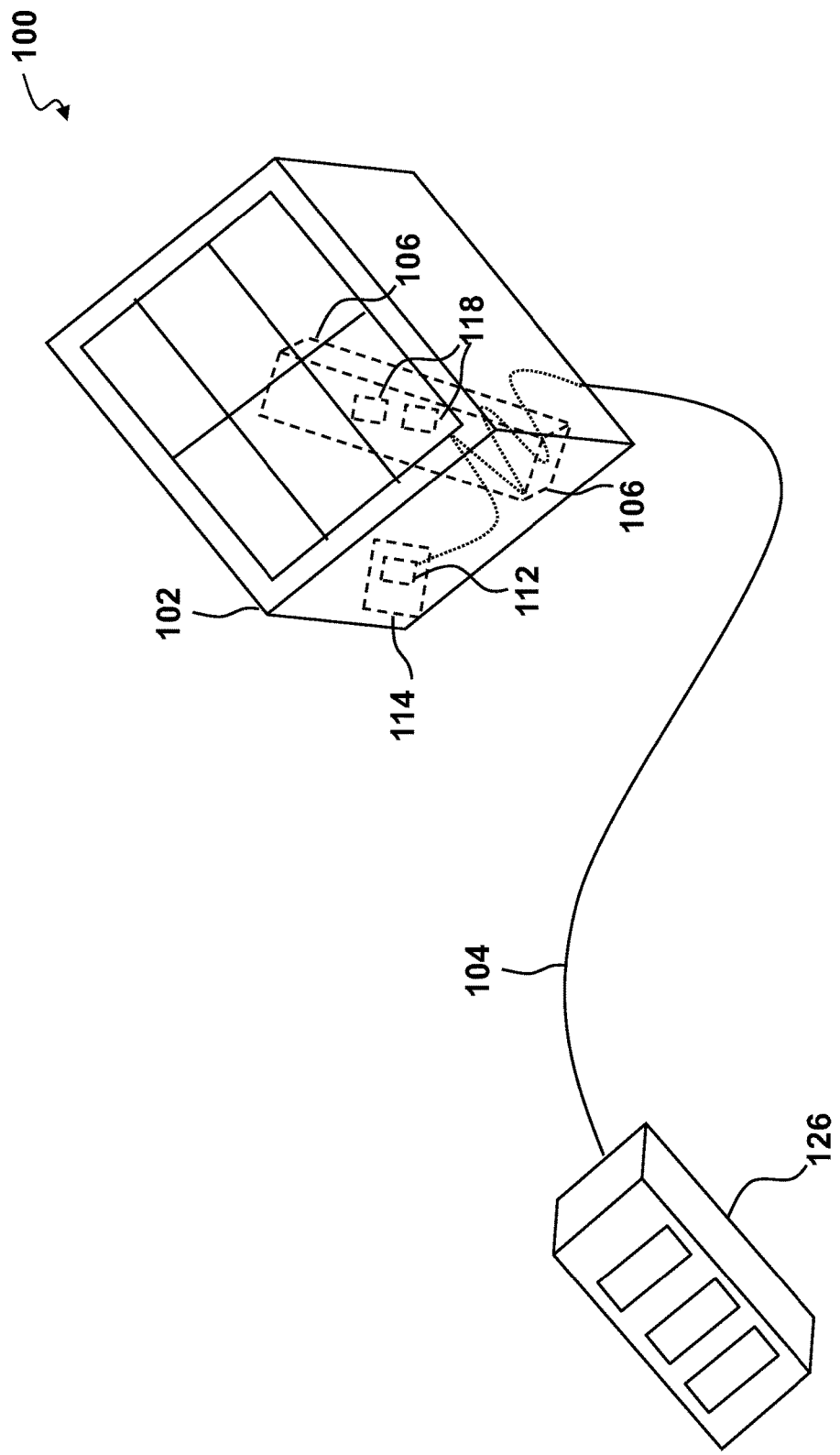
FIG. 1 depicts a multi-pack launcher (MPL) system.

With respect to FIG. 1 a multi-pack launcher (MPL) system 100 is illustrated. The MPL system 100 includes a launch control box 126, an MPL box 102, and a cable 104 connecting the launch control box 126 to the MPL box 102. The cable 104 may be routed underneath a missile and/or unmanned aerial vehicle (UAV) 106 inside the MPL box 102 to couple radio frequency (RF) signals produced by the cable 104 to at least one antenna 118 located at the back of the missile 106. The cable 104 may then connect to a control printed circuit board (PCB) 114 where the RF signals produced by the cable 104 may be filtered with an RF filter 112 to remove the RF energy. In one embodiment, the cable 104 may function as an antenna to feed RF signals to the missile 106 inside the MPL box 102, as described in further detail below. In one embodiment, the MPL box 102 is made of metal. The MPL box 102 may be shielded from RF signals by the box material, e.g., metal, and/or additional shielding. Other MPL box 102 materials are possible and contemplated.

Figure 2A:
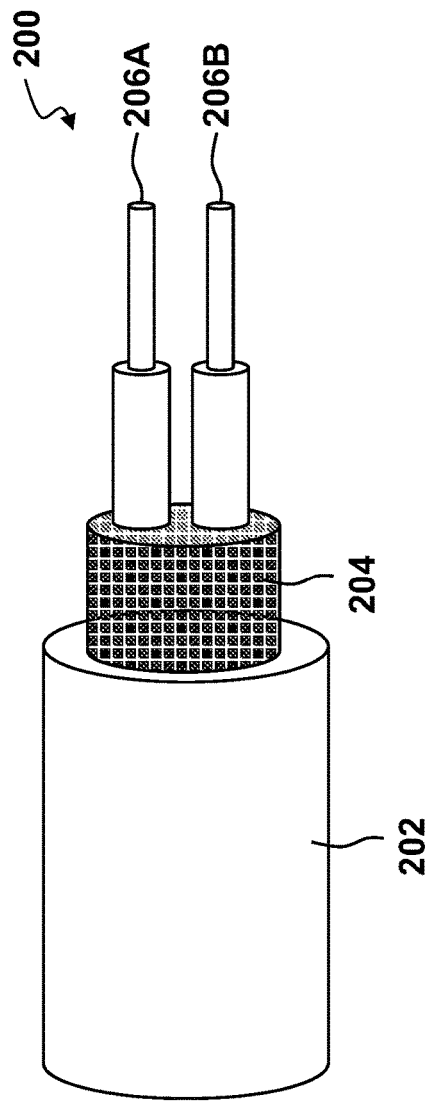
FIG. 2A depicts a cable according to one embodiment.

FIG. 2A depicts a cable 200 according to one embodiment. The cable 200 may include an outer jacket 202, a shielded braid 204, a first wire 206A, and a second wire 206B. The first wire 206A and the second wire 206B may be shielded by the shielded braid 204. While a shielded braid is depicted, any type of shielding known in the art is possible and contemplated. The shielded braid 204 ensures that any radio frequency (RF) signals picked up by the cable 200 does not find its way into a connected box, such as the MPL box 102 of FIG. 1.

Figure 2B:
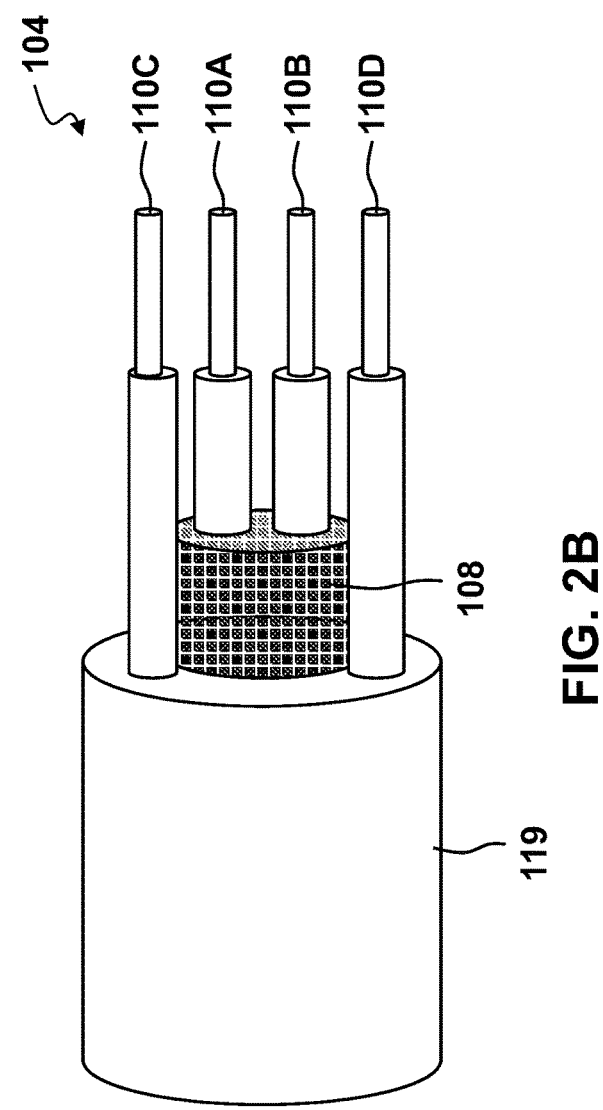
FIG. 2B depicts the cable of the MPL system of FIG. 1.

FIG. 2B depicts the cable 104 of the MPL system of FIG. 1. The cable 104 may include an outer jacket 119, a shielded braid 108, a first wire 110A, a second wire 110B, a third wire 110C, and a fourth wire 110D. The first wire 110A and the second wire 110B may be shielded by the shielded braid 108. While a shielded braid is depicted, any type of shielding is possible and contemplated. The third wire 110C and the fourth wire 110D may be outside of and not covered by the shielded braid 108.

The cable 104 of FIG. 2B accomplishes the opposite result of the cable 200 of FIG. 2A in that the third wire 110C and the fourth wire 110D of the cable 104 of FIG. 2B act as an antenna. The third wire 110C and the fourth wire 110D bring RF signals into a connected box, such as the MPL box 102 of FIG. 1. Once inside the MPL box 102 of FIG. 1, the RF signals in the cable 104 may be received by an antenna, receiver, and/or transceiver of a missile and/or unmanned aerial vehicle (UAV) within the MPL box 102 of FIG. 1. The third wire 110C and the fourth wire 110D of the cable 104 act as an antenna.

The pair of outer wires 110C, 110D of the signal carrying wires 110A-D may function as an antenna and the outer wires 110C, 110D may transmit RF signals into the MPL box 102. As described above, the cable 104 may then be routed underneath a missile to couple the RF energy to the antennas in the back of the missile. The cable 104 then connects to the control PCB. More specifically, the cable 104 connects to the RF filter, and the RF filter 112 removes the RF energy produced by the cable 104. The cable 104 may operate as an antenna to transmit RF signals to the one or more missiles 106 located inside the MPL box 102.

In one embodiment, the outer wires 110C, 110D may include a plurality of strands of higher gauge wire. In one embodiment, the outer wires 110C, 110D include, for example, roughly 15 strands of higher gauge wire. Two inner wires 110A, 110B may be low gauge (e.g., thicker than the higher gauge wires 110C, 110D). In one embodiment, the inner wires 110A, 110B may carry the power needed to operate the MPL box 102 of FIG. 1.

If a heavy object or a piece of metal (e.g., tank thread, shrapnel etc.) severs the cable 104, the inner wires 110A, 110B may be shorted to the braid or shield 108, which is at ground potential. As a result, a built-in fuse may blow or be tripped, which may render the MPL box safe from an unintentional firing of the missile 106.

As the cable 104 enters the MPL box, the cable 104 may be isolated with polyoxymethylene and/or rubber from the case of the MPL box. This prevents the RF signals picked up on the outer wires 110C,110D from dissipating into the grounded MPL box 102. By separating the outer wire 110C, 110D from the grounded MPL box with an insulator, the capacitance of the wires 110C, 110D to the MPL box may be reduced.

With respect to FIGS. 3A-3C and 4, in the case of an operator leaving equipment (such as an object 128) underneath an open door 122 of the MPL box 102, the operator may then remotely try to close the door causing mechanical misalignment of the door hinge and drive train.

FIG. 3A depicts an object 128 underneath an open door 122 of an MPL box 102 of the MPL system of FIG. 1. An operator may command the door 122 to be closed, such as by actuator 124.

FIG. 3B depicts the door 122 of the MPL box 102 contacting the object 128 of FIG. 3A. To remedy this, a current sense circuit 201, as shown as a block diagram in FIG. 4, may activate after a preset brief high current period of time, for example, approximately two seconds. Other timing is possible and contemplated.

Figure 4:
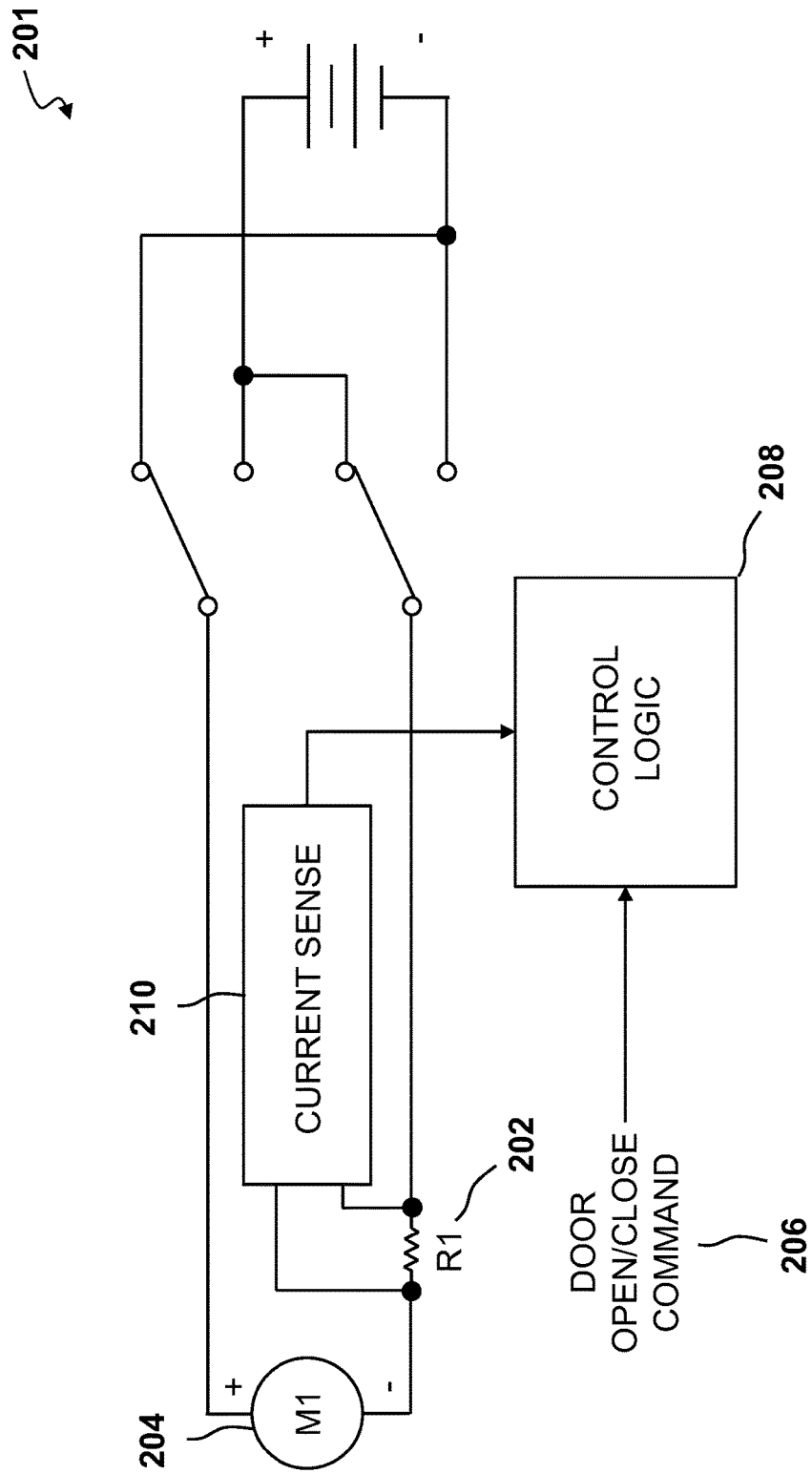
FIG. 4 depicts a current sense circuit associated with the MPL system of FIG. 1.

In one embodiment, the current sense circuit 201 of FIG. 4 is associated with the control PCB 114, as shown in FIG. 1. The high current ensures the door 122 closes with the initial high current required by the actuator 124. After this period, such as after two seconds, the circuit 201 of FIG. 4 monitors the current of the actuator 124, and if the current exceeds a preset amount, the circuit 201 may take an action, such as reversing the door 122 direction to open the door 122, as in FIG. 3C or stopping movement of the actuator to remain in the position as shown in FIG. 3B.

FIG. 3C depicts the door 122 of the MPL box opening due to contacting the object 128 of FIG. 3B underneath the open door. The operator may observe that the door 122 did not close, such as through a visible confirmation, a door open indicator light, or the like. The operator may then remove the cause of the jam, such as an object 128. The operator may also toggle the door switch again to attempt to close the door 122, such as with a door open/close command 206 as shown in FIG. 4. If the jam continues, the door 122 may automatically lift back up again.

FIG. 4 depicts the current sense circuit 201 associated with the MPL system of FIG. 1. In one embodiment, the circuit 201 is activated for door 122 of FIGS. 3A-3C closing only and not for opening the door 122. In one embodiment, control logic 208 ensures that the behavior described above is implemented for door closing only. In one embodiment, a resistor R1 202 may measure the current to a door motor M1 204, such as actuator 124 of FIGS. 3A-3C, with a current sensor 210. In some embodiments, the circuit 201 may only be activated for door 122 closing and not door 122 opening.

Figure 5:
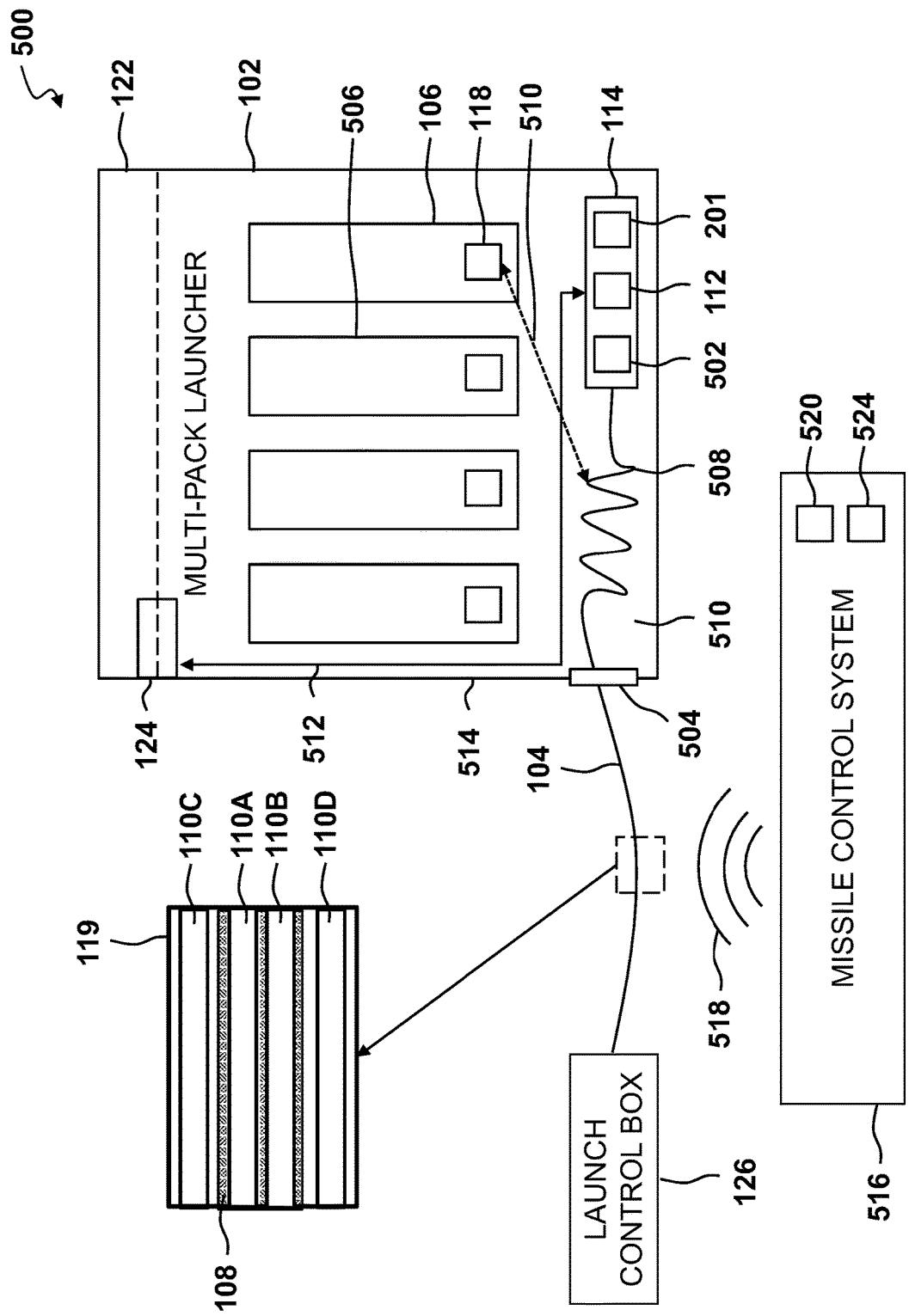
FIG. 5 depicts a high-level block diagram of the MPL system of FIGS. 1, 2B, 3A, 3B, 3C, and 4.

FIG. 5 depicts a high-level block diagram of the MPL system 500 of FIGS. 1, 2B, 3A, 3B, 3C, and 4. The system 500 may include a multi-pack launcher (MPL) box 102, a launch control box 126, and a cable 104 connected between the launch control box 126 and the MPL box 102. In some embodiments, the cable 104 may be about 150 feet so as to provide separation between the MPL box 102 and the operator controlling the launch via the launch control box 126.

The cable 104 may include the outer jacket 119, the shielded braid 108, the first wire 110A, the second wire 110B, the third wire 110C, and the fourth wire 110D. The first wire 110A and the second wire 110B may be shielded by the shielded braid 108. While a shielded braid is depicted, any type of shielding is possible and contemplated. The third wire 110C and the fourth wire 110D are outside of and not covered by the shielded braid 108.

If the cable 104 is punctured or damaged, the third wire 110C and/or the fourth wire 110D may be shorted to the shielded braid 108, which is at ground potential. As a result, a built-in fuse 502 may blow, which may render the MPL box 102 safe from an unintentional firing of a missile and/or unmanned aerial vehicle. The built-in fuse 502 is depicted as part of the control printed circuit board (PCB) 114 of the MPL box 102. In some embodiments, the built-in fuse 502 may be a part of the launch control box 126. In other embodiments, the built-in fuse 502 may be a part of the cable 104. In some embodiments, the two inner cables 110A, 110B may carry power. These two inner cables 110A, 110B may cause the built-in fuse 502 to blow if shorted to each other and/or the shielded braid 108. The outer wires 110C, 110D may also prevent the system from operating properly if severed and or grounded to the shielded braid 108. In some embodiments, the outer wires 100C, 110D may not blow the built-in fuse 502, because the outer wires are signal carrying wires.

The cable 104 may enter the MPL box 102 at a box interface 504. In some systems, any wire coming into an MPL box 102 may be shielded and heavily filtered at the box interface so that any RF picked up by the cable does not find its way into the MPL box. In some embodiments, the MPL box 102 may be metal so as to attenuate external RF signals from outside of the MPL box 102. In the disclosed embodiment, the box interface 504 may isolate the cable 104 from a metal case 514 of the MPL box 102, such as by polyoxymethylene (Delrin) and/or rubber. This isolation by the box interface 504 may prevent the RF signals, picked up on the outer wires 110C, 110D of the cable 104, from dissipating into the grounded metal 514 of the MPL box 102.

The third wire 110C and the fourth wire 110D of the cable 104 act as an antenna. The third wire 110C and the fourth wire 110D bring RF signals into the MPL box 102. Once inside the MPL box 102, the RF signals in the cable 104 may be received by an antenna, receiver, and/or transceiver of a missile and/or unmanned aerial vehicle (UAV) within the MPL box 102 of FIG. 1. The third wire 110C and the fourth wire 110D of the cable 104 act as an antenna.

The cable 104 may be routed 508 underneath a missile 106 and/or unmanned aerial vehicle (UAV) 506 inside the MPL box 102 to couple RF signals emitted by the cable 104 to at least one antenna 118 located on the missile 106 and/or UAV. In some embodiments, at least one antenna may be a receiver or a transceiver. In some embodiments, the cable 104 may be routed 508 in an S-shape, serpentine shape, coil, or other shape so as to provide a greater length of cable 104 in a bottom portion 510 of the MPL box 102 for better coupling of RF signals.

The cable 104 may connect to the PCB 114 of the MPL box 112. In some embodiments, the PCB 114 may include the RF filter 112 to remove the RF energy from the cable 114. In some embodiments, the PCB 114 may also include the current sense circuit 201. The current sense circuit 201 may be in communication with an actuator 124 for opening and closing a door 122 of the MPL box 102. The current sense circuit 201 may prevent closing of the door 122 when an object, such as shown in FIGS. 3A-3C, is present and preventing the door 122 from closing. The current sense circuit 201 may be located apart from the PCB 114 in some embodiments.

The MPL box 102 may store one or more missiles 106 and/or unmanned aerial vehicles (UAVs) 506. In some embodiments, the missile may be a UAV or an all-up-rounds (AUR). In some embodiments, the MPL may store one or AURs. An AUR may include a missile that flies the mission, a booster that starts its flight, and a container that protects it during transportation, storage and stowage. In some embodiments, the container may act as a launch tube.

In one embodiment, an RF signal 518 may be emitted from a separate missile control system 516. The missile control system 516 may include a processor 520 with addressable memory and a transmitter and/or transceiver 524 that transmits RF signals 518 to command and control the one or more missiles 106 within the MPL box 102. This RF link is required before the missile 106 is launched to assure that all systems are "go." Once the missile 106 exits the MPL box 102, this transmitter 524 of the missile control system 516 directly communicates with the antenna 118 on the missile 106 and controls the missile 106. The missile control system 516 may be a wholly detached system having its own power source. The missile control system 516 may be physically located apart from the MPL box 102. In such embodiments, it is only required that the cable 104 be placed in the path of the antenna radiation lobes so that a link with the missiles 106 inside the MPL box 102 is capable of being established.

Figure 6:
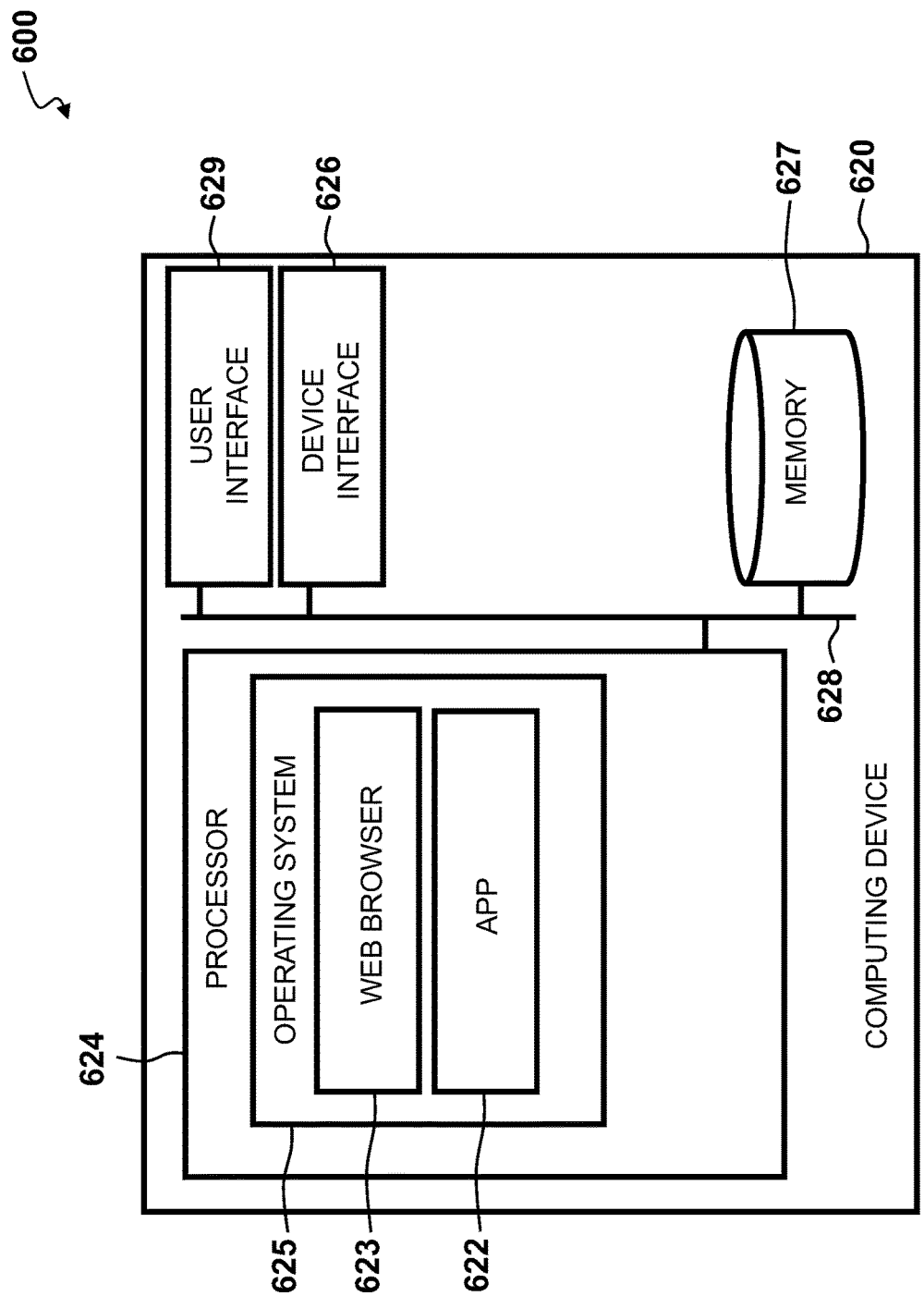
FIG. 6 illustrates an example top-level functional block diagram of a computing device embodiment.

FIG. 6 illustrates an example of a top-level functional block diagram of a computing device embodiment 600. The example operating environment is shown as a computing device 620 comprising a processor 624, such as a central processing unit (CPU), addressable memory 627, an external device interface 626, e.g., an optional universal serial bus port and related processing, and/or an Ethernet port and related processing, and an optional user interface 629, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 628. In some embodiments, via an operating system 625 such as one supporting a web browser 623 and applications 622, the processor 624 may be configured to execute steps of a process establishing a communication channel and processing according to the embodiments described above.

Figure 7:
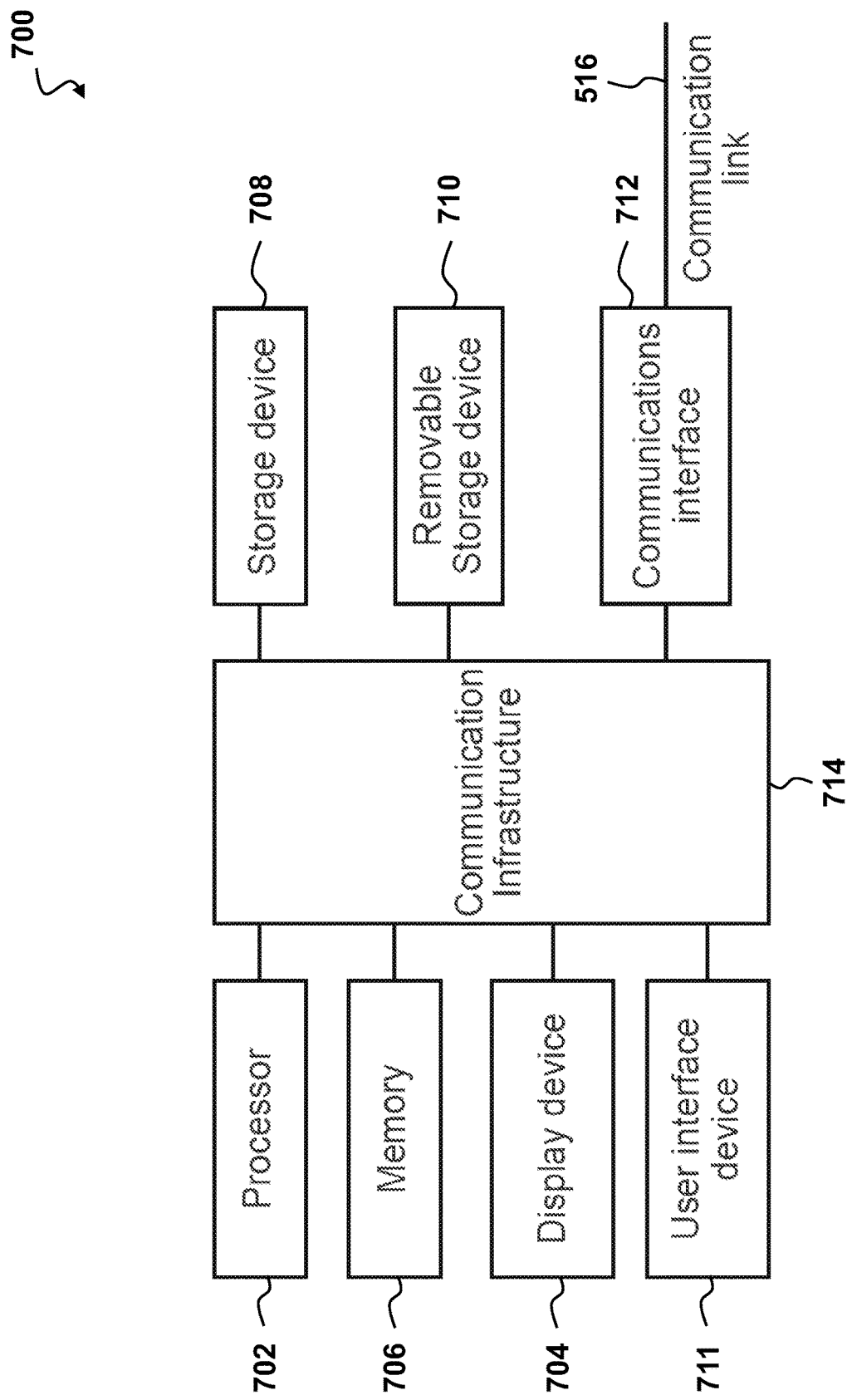
FIG. 7 shows a high-level block diagram and process of a computing system for implementing an embodiment of the system and process.

FIG. 7 is a high-level block diagram 700 showing a computing system comprising a computer system useful for implementing an embodiment of the system and process, disclosed herein. Embodiments of the system may be implemented in different computing environments. The computer system includes one or more processors 702, and can further include an electronic display device 704 (e.g., for displaying graphics, text, and other data), a main memory 706 (e.g., random access memory (RAM)), storage device 708, a removable storage device 710 (e.g., removable storage drive, a removable memory module, a magnetic tape drive, an optical disk drive, a computer readable medium having stored therein computer software and/or data), user interface device 711 (e.g., keyboard, touch screen, keypad, pointing device), and a communication interface 712 (e.g., modem, a network interface (such as an Ethernet card), a communications port, or a PCMCIA slot and card). The communication interface 712 allows software and data to be transferred between the computer system and external devices. The system further includes a communications infrastructure 714 (e.g., a communications bus, cross-over bar, or network) to which the aforementioned devices/modules are connected as shown.

Information transferred via communications interface 714 may be in the form of signals such as electronic, electromagnetic, optical, or other signals capable of being received by communications interface 714, via a communication link 716 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 712. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
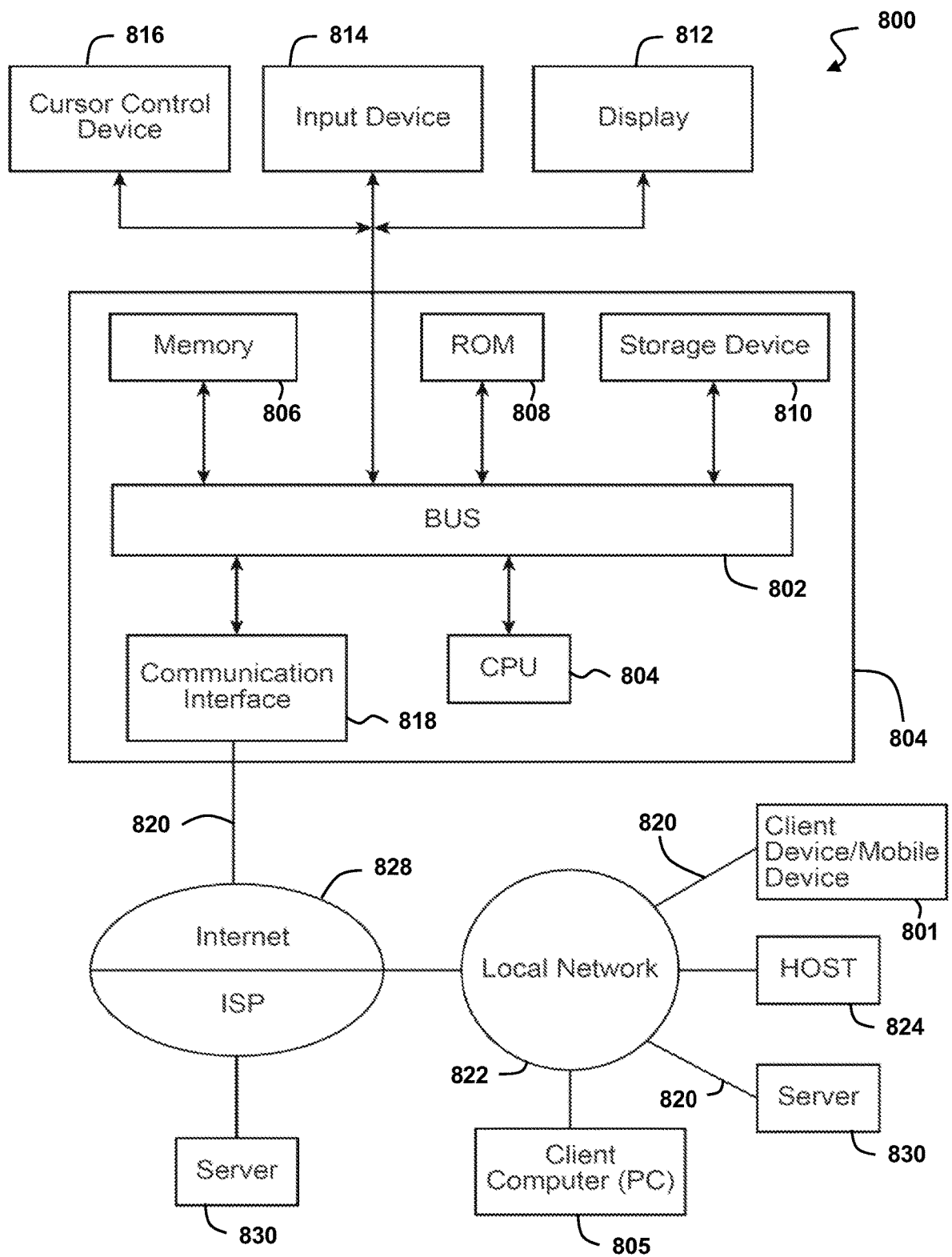
FIG. 8 shows a block diagram and process of an exemplary system in which an embodiment may be implemented.

FIG. 8 shows a block diagram of an example system 800 in which an embodiment may be implemented. The system 800 includes one or more client devices 801 such as consumer electronics devices, connected to one or more server computing systems 830. A server 830 includes a bus 802 or other communication mechanism for communicating information, and a processor (CPU) 804 coupled with the bus 802 for processing information. The server 830 also includes a main memory 806, such as a random access memory (RAM) or other dynamic storage device, coupled to the bus 802 for storing information and instructions to be executed by the processor 804. The main memory 806 also may be used for storing temporary variables or other intermediate information during execution or instructions to be executed by the processor 804. The server computer system 830 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions. The bus 802 may contain, for example, thirty-two address lines for addressing video memory or main memory 806. The bus 802 can also include, for example, a 32-bit data bus for transferring data between and among the components, such as the CPU 804, the main memory 806, video memory and the storage 810. Alternatively, multiplex data/address lines may be used instead of separate data and address lines.

The server 830 may be coupled via the bus 802 to a display 812 for displaying information to a computer user. An input device 814, including alphanumeric and other keys, is coupled to the bus 802 for communicating information and command selections to the processor 804. Another type or user input device comprises cursor control 816, such as a mouse, a trackball, or cursor direction keys for communicating direction information and command selections to the processor 804 and for controlling cursor movement on the display 812.

According to one embodiment, the functions are performed by the processor 804 executing one or more sequences of one or more instructions contained in the main memory 806. Such instructions may be read into the main memory 806 from another computer-readable medium, such as the storage device 810. Execution of the sequences of instructions contained in the main memory 806 causes the processor 804 to perform the process steps described herein. One or more processors in a multi-processing arrangement may also be employed to execute the sequences of instructions contained in the main memory 806. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 804 for execution. Such a medium may take many forms, including but not limited to, non-volatile media, volatile media, and transmission media. Non-volatile media includes, for example, optical or magnetic disks, such as the storage device 810. Volatile media includes dynamic memory, such as the main memory 806. Transmission media includes coaxial cables, copper wire and fiber optics, including the wires that comprise the bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 804 for execution. For example, the instructions may initially be carried on a magnetic disk of a remote computer. The remote computer can load the instructions into its dynamic memory and send the instructions over a telephone line using a modem. A modem local to the server 830 can receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 806, from which the processor 804 retrieves and executes the instructions. The instructions received from the main memory 806 may optionally be stored on the storage device 810 either before or after execution by the processor 804.

The server 830 also includes a communication interface 818 coupled to the bus 802. The communication interface 818 provides a two-way data communication coupling to a network link 820 that is connected to the world wide packet data communication network now commonly referred to as the Internet 828. The Internet 828 uses electrical, electromagnetic, or optical signals that carry digital data streams. The signals through the various networks and the signals on the network link 820 and through the communication interface 818, which carry the digital data to and from the server 830, are exemplary forms or carrier waves transporting the information.

In another embodiment of the server 830, interface 818 is connected to a network 822 via a communication link 820. For example, the communication interface 818 may be an integrated services digital network (ISDN) card or a modem to provide a data communication connection to a corresponding type of telephone line, which can comprise part of the network link 820. As another example, the communication interface 818 may be a local area network (LAN) card to provide a data communication connection to a compatible LAN. Wireless links may also be implemented. In any such implementation, the communication interface 818 sends and receives electrical electromagnetic or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP). The ISP in turn provides data communication services through the Internet 828. The local network 822 and the Internet 828 both use electrical, electromagnetic, or optical signals that carry digital data streams. The signals through the various networks and the signals on the network link 820 and through the communication interface 818, which carry the digital data to and from the server 830, are exemplary forms or carrier waves transporting the information.

The server 830 can send/receive messages and data, including e-mail, program code, through the network, the network link 820 and the communication interface 818. Further, the communication interface 818 can comprise a USB/Tuner and the network link 820 may be an antenna or cable for connecting the server 830 to a cable provider, satellite provider or other terrestrial transmission system for receiving messages, data and program code from another source.

The example versions of the embodiments described herein may be implemented as logical operations in a distributed processing system such as the system 800 including the servers 830. The logical operations of the embodiments may be implemented as a sequence of steps executing in the server 830, and as interconnected machine modules within the system 800. The implementation is a matter of choice and can depend on performance of the system 800 implementing the embodiments. As such, the logical operations constituting said example versions of the embodiments are referred to for e.g., as operations, steps or modules.

Similar to a server 830 described above, a client device 801 can include a processor, memory, storage device, display, input device and communication interface (e.g., e-mail interface) for connecting the client device to the Internet 828, the ISP, or LAN 822, for communication with the servers 830.

The system 800 can further include computers (e.g., personal computers, computing nodes) 805 operating in the same manner as client devices 801, where a user can utilize one or more computers 805 to manage data in the server 830.

Figure 9:
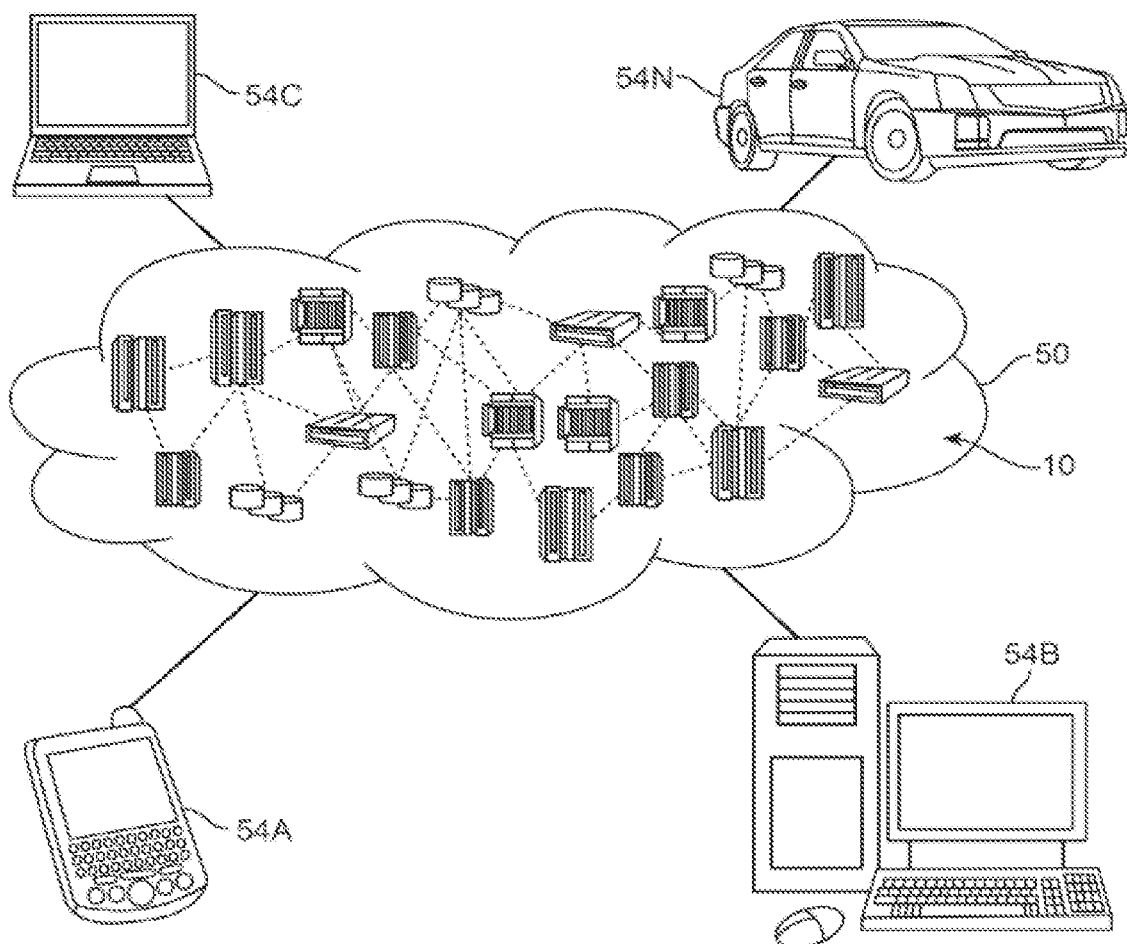
FIG. 9 depicts a cloud computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
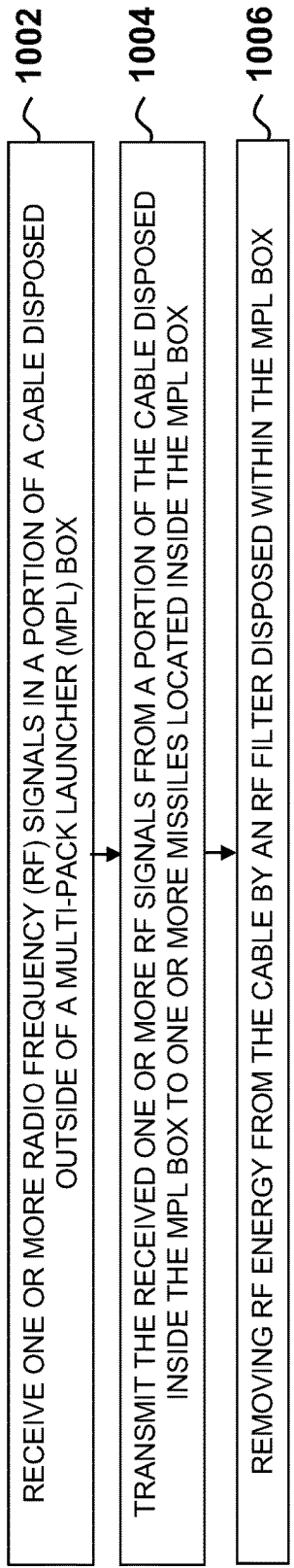
FIG. 10 depicts a high-level flowchart of a method embodiment of sending RF signals to one or more missiles in a multi-pack launcher (MPL) box via a cable.

FIG. 10 depicts a high-level flowchart of a method embodiment of sending RF signals to one or more missiles in a MPL box via a cable 1000. The method 1000 may include receiving one or more RF signals in a portion of a cable disposed outside of the MPL box (step 1002). As described herein, the cable may include: an outer jacket, a shielded braid, a first wire, a second wire, a third wire, and a fourth wire. The first wire and the second wire may be shielded by the shielded braid. The third wire and the fourth wire may be outside of the shielded braid. The third wire and the fourth wire may act as an antenna. The method 1000 may also include transmitting the received one or more RF signals from a portion of the cable disposed inside the MPL box to one or more missiles located inside the MPL box (step 1004). In some embodiments, the cable may be routed in an S-shape, serpentine shape, coil, or other shape so as to provide a greater length of cable in a bottom portion of the MPL box for better coupling of RF signals. The method 1000 may also include removing RF energy from the cable by an RF filter connected to an end of the cable. The RF filter may be disposed within the MPL box.

Figure 11:
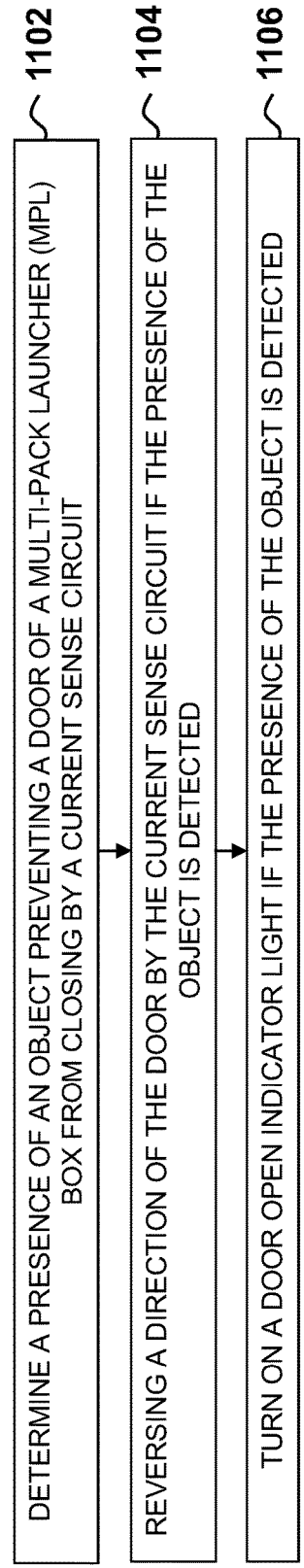
FIG. 11 depicts a high-level flowchart of a method embodiment of detecting an object preventing a door of a multi-pack launcher (MPL) box from closing.

FIG. 11 depicts a high-level flowchart of a method embodiment of detecting an object preventing a door of a MPL box from closing 1100. The method 1100 may include determining a presence of an object preventing a door of the MPL box from closing by a current sense circuit (step 1102). The current sense circuit may determine the presence of the object if a current of an actuator configured to close the door exceeds a preset amount for a preset high current period of time. The method 1100 may also include reversing a direction of the door by the current sense circuit if the presence of the object is detected (step 1104). In some embodiments, the method may include stopping closing of the door so as to stop the actuator and prevent any misalignment of hinges of the door of the MPL box. The method 1100 may also include turning on a door open indicator light by the current sense circuit if the presence of the object is detected (step 1106). The indicator light may be seen by an operator so that the operator can remove the object and allow the door of the MPL box to be closed.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
 a multi-pack launcher (MPL) box, wherein the MPL box comprises a door, wherein the door is configured to open and close;
 a current sense circuit, wherein the current sense circuit is configured to detect an object that prevents closing of the door of the MPL box;
 an actuator configured to open and close the door of the MPL box, wherein the current sense circuit is in communication with the actuator, and wherein the current sense circuit detects the object by determining if a current of the actuator configured to open and close the door exceeds a preset amount for a preset amount of time.

2. The system of claim 1, wherein the current sense circuit is configured to open the door via the actuator if the object preventing closing of the door is detected.

3. The system of claim 1, wherein the current sense circuit is configured to turn on a door open indicator light if the object preventing closing of the door is detected.

4. The system of claim 1, wherein the current sense circuit is configured to stop movement of the actuator if the object preventing closing of the door is detected.

5. The system of claim 1, wherein the current sense circuit is configured to close the door via the actuator once the object preventing closing of the door is removed.

6. The system of claim 1, wherein the current sense circuit detects the object by determining if the current of the actuator exceeds the preset amount for the preset amount of high current period of time.

7. The system of claim 1, wherein the current sense circuit detects the object by determining if the current of the actuator exceeds the preset amount for the preset amount of time when the actuator is at least one of: closing the door and opening the door.

8. The system of claim 1, wherein the current sense circuit comprises a resistor configured to measure the current of the actuator, and wherein the current sense circuit comprises a current sensor configured to measure the current of the actuator.

9. The system of claim 8, wherein the current sense circuit detects the object by determining if the current of the actuator exceeds the preset amount after the preset amount of high current period of time.

10. The system of claim 1, further comprising:
 a door motor configured to open and close the door of the MPL box, wherein the current sense circuit is in communication with the door motor.

11. The system of claim 1, further comprising:
 at least one missile disposed in the MPL box.

12. The system of claim 11, wherein the at least one missile is at least one of: an unmanned aerial vehicle (UAV) and an all-up-round (AUR), wherein the at least one missile further comprises at least one antenna, wherein the at least one antenna is configured to receive radio frequency (RF) signals.

13. A method comprising:
 receiving, by a multi-pack launcher (MPL) box, a door close command to close a door of the MPL box via an actuator configured to open and close the door of the MPL box based on determining if a current of the actuator exceeds a preset amount for a preset amount of time;
 detecting, by a current sense circuit, an object that prevents closing of the door of the MPL box; and
 stopping movement of the actuator if the object preventing closing of the door is detected.

14. The method of claim 13, further comprising:
 detecting, by the current sense circuit, the object that prevents closing of the door of the MPL box.

15. The method of claim 13, further comprising:
opening the door via the actuator if the object preventing closing of the door is detected.

16. The method of claim 13, further comprising:
turning on a door open indicator light if the object preventing closing of the door is detected.

17. The method of claim 13, further comprising:
closing the door via the actuator once the object preventing closing of the door is removed.

* * * * *